United States Patent
Kwan et al.

(10) Patent No.: US 7,962,182 B2
(45) Date of Patent: Jun. 14, 2011

(54) METHOD AND APPARATUS FOR CONTENT DELIVERY TO DEVICES

(75) Inventors: Wilson Kwan, Toronto (CA); Aris Balatsos, Toronto (CA); Kevin O'Neil, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 694 days.

(21) Appl. No.: 11/467,451

(22) Filed: Aug. 25, 2006

(65) Prior Publication Data

US 2008/0049660 A1 Feb. 28, 2008

(51) Int. Cl.
  *H04B 1/38* (2006.01)
  *H04N 7/14* (2006.01)

(52) U.S. Cl. ...... 455/574; 370/260; 370/318; 348/14.12

(58) Field of Classification Search .................. 455/574; 370/260, 318; 348/14.12
See application file for complete search history.

(56) References Cited

U.S. PATENT DOCUMENTS

| | | | |
|---|---|---|---|
| 5,579,339 A | | 11/1996 | McClaughry |
| 5,822,318 A | * | 10/1998 | Tiedemann et al. ........... 370/391 |
| 6,097,435 A | * | 8/2000 | Stanger et al. ............ 375/240.03 |
| 6,373,855 B1 | * | 4/2002 | Downing et al. ............. 370/468 |
| 6,469,733 B2 | * | 10/2002 | Chong et al. ............... 348/14.08 |
| 6,493,326 B1 | | 12/2002 | Ramachandran |
| 6,665,002 B2 | * | 12/2003 | Liu ........................... 348/14.12 |
| 6,956,488 B2 | * | 10/2005 | Hasegawa ................ 340/636.15 |
| 7,007,098 B1 | * | 2/2006 | Smyth et al. .................. 709/233 |
| 7,010,329 B2 | * | 3/2006 | Livet et al. ..................... 455/574 |
| 7,251,737 B2 | * | 7/2007 | Weinberger et al. .......... 713/320 |
| 7,328,035 B2 | * | 2/2008 | Kelley et al. .................. 455/518 |
| 7,330,740 B2 | * | 2/2008 | Bennett et al. ................ 455/574 |
| 7,421,291 B2 | * | 9/2008 | Karaoguz et al. ............. 455/574 |
| 7,570,976 B2 | * | 8/2009 | Jin et al. ........................ 455/574 |
| 7,729,391 B2 | * | 6/2010 | Miyaji et al. .................. 370/537 |
| 2004/0204181 A1 | * | 10/2004 | Cromer et al. ................ 455/574 |
| 2005/0033879 A1 | * | 2/2005 | Hwang et al. ................... 710/52 |
| 2005/0059421 A1 | * | 3/2005 | Reed et al. ..................... 455/522 |
| 2005/0141858 A1 | * | 6/2005 | Kumagai ......................... 386/46 |
| 2005/0143115 A1 | * | 6/2005 | Hiddink et al. ............... 455/522 |
| 2005/0143119 A1 | * | 6/2005 | Chandra et al. ............... 455/522 |
| 2006/0176832 A1 | * | 8/2006 | Miceli ........................... 370/260 |
| 2006/0215755 A1 | * | 9/2006 | Ju ............................. 375/240.12 |
| 2007/0004466 A1 | * | 1/2007 | Haartsen ...................... 455/572 |
| 2007/0091920 A1 | * | 4/2007 | Harris et al. ................... 370/468 |
| 2007/0142098 A1 | * | 6/2007 | Behzad et al. ................ 455/574 |

FOREIGN PATENT DOCUMENTS

| | | |
|---|---|---|
| JP | 2000-069556 | 3/2000 |
| JP | 2000-174696 | 6/2000 |

* cited by examiner

*Primary Examiner* — Lester Kincaid
*Assistant Examiner* — Steven Kelley
(74) *Attorney, Agent, or Firm* — Kevin T. Cheatham

(57) ABSTRACT

A technique for adjusting or modifying content delivery to devices is provided, thereby offering a degree of power consumption control in such devices. The device can determine a need to modify power consumption, either in response to an input or via detection of an unfavorable power supply condition. In response, the device sends a request to an infrastructure for at least one reduced rate data stream. Because the at least one reduced rate data stream requires less processing power when undergoing decoding operations, the device subsequently consumes less power. In one embodiment of the present invention, the determination of the unfavorable power supply condition may be based on a configurable power condition profile. Furthermore, subsequent to receiving the at least one reduced rate data stream, the device may provide a request to the infrastructure for at least one increased rate data stream.

24 Claims, 4 Drawing Sheets he features of the present invention are set forth with
METHOD AND APPARATUS FOR CONTENT DELIVERY TO DEVICES

FIELD OF THE INVENTION

The present invention relates generally to communication systems comprising at least one device and, in particular, to techniques for adjusting content delivery to such devices.

BACKGROUND OF THE INVENTION

Battery operated communication devices are well known in the art. Such devices may comprise, for example, cellular telephones, personal digital assistants, or even laptop computers with wireless or wired connections to other resources, such as a communication network. As such devices have evolved, the quantity and quality of data that may be received and reproduced by such devices has dramatically increased. For example, it has very recently become common for current cellular telephones to be equipped with multi-media capability such that the cellular telephone can receive and decode various types of media streams such as audio, video, two-dimensional (2D) and three-dimensional (3D) graphics, etc.

With the increased capability of such devices, there's has been a commensurate increase in the power demands placed upon such devices. For example, in order to provide the greater functionality called for by multi-media applications, the amount of processing or computing power available in such devices has been commensurately increased. As a result, greater power consumption occurs. To address this situation, longer lasting batteries having greater storage capacity have been created. However, there are limits to the improvements available through battery technologies. Other techniques are necessary if devices are to be able to keep up with the power demands of ever more capable user applications.

Other techniques for reducing power supply consumption in devices are known, particularly for devices that perform encoding of various media types. For example, U.S. Pat. No. 6,493,326 discloses a technique which lowers the encoding rate of a variable rate voice coder in response to reduced voice activity by a user of the device. In this manner, the circuitry necessary to transmit the voice data is energized less frequently, thereby resulting in reduced power consumption. In a similar vein, Japanese Published Patent Application No. 2000-174696 teaches a system in which the voltage of a battery is monitored to determine when the voltage falls below a certain threshold. When this occurs, the rate of voice encoding is decreased, e.g. to half rate or less, such that the time required to transmit voice data is similarly decreased. Once again, power consumption of the device may be reduced. Further still, Published Japanese Patent Application No. 2000-069556 describes a system in which an encoding rate upper limit for a voice encoder is set by user of the device. When a power saving mode is entered, preferably through actuation of an input mechanism by a user of the device, the encoding rate of the voice encoder is limited by the previously established upper limit. Each of the above-described techniques limits power usage by reducing the rate of encoding activities performed by the device.

Silent on the problem of reducing power consumption in devices, U.S. Pat. No. 5,579,339 describes a system in which a communication unit (i.e., a device) can transmit a request to concurrently monitor multiple, digitally-encoded communications in a wireless communication system. To this end, a wireless network in communication with the unit provides interleaved, reduced rate communications to the communication unit. For example, in order to monitor two communication streams, the wireless network provides two communication streams, each encoded at half rate encoding levels. In this manner, devices are able to request reduced rate data streams from a communication network.

However, the prior art is silent with regard to techniques whereby devices may control the rate of received data streams in response to sensed power conditions. Therefore, it would be advantageous to provide techniques that overcome these limitations. It would be additionally advantageous for such techniques to be applicable to non-battery powered devices for which energy conservation is nevertheless an issue of concern.

BRIEF DESCRIPTION OF THE DRAWINGS

The features of the present invention are set forth with particularity in the appended claims. The invention itself, together with further features and attendant advantages, will become apparent from consideration of the following detailed description, taken in conjunction with the accompanying drawings. One or more embodiments of the present invention is now described, by way of example only, with reference to the accompanying drawings wherein like reference numerals represent like elements and in which:

DETAILED DESCRIPTION OF THE PRESENT EMBODIMENTS

Briefly, the present invention provides a technique for adjusting or modifying content delivery to devices, preferably battery operated devices, thereby providing a degree of power consumption control in such devices. In particular, a device may receive at least one data stream from an infrastructure. Either prior to or while receiving the at least one data stream, the device can determine the existence of a need to modify power consumption. In one embodiment, the need to modify power consumption may result from the detection of an unfavorable power supply condition. Alternatively, the need may result from an input (e.g., from a user of the device or a managing entity) instructing the device to reduce power consumption. Regardless, in response, the device sends a request to the infrastructure for at least one reduced rate data stream that is subsequently received by the device. Because the at least one reduced rate data stream requires less processing power when undergoing decoding operations, the device subsequently consumes less power. In one embodiment of the present invention, the determination of the unfavorable power supply condition may be based on a configurable power condition profile. Furthermore, subsequent to receiving the at least one reduced rate data stream, the device may determine a need or opportunity to return to normal power consumption levels (e.g., a favorable power supply condition or a received input) and thereafter provide a request to the infrastructure for at least one increased rate data stream.

Within the infrastructure, with which the device communicates, an infrastructure device in accordance with the present invention provides at least one data stream to the device. Either prior to or while providing the at least one data stream to the device, the infrastructure device may receive a request from the device for at least one reduced data stream. In response, the infrastructure device provides the at least one reduced rate data stream to the device. In one presently preferred technique for providing a reduced rate data stream, the infrastructure device, itself or acting through the use of another device, can modify (in this case, increase; sometimes referred to in the art as transcoding) the compression ratio of the encoded data to provide the at least one reduced rate data stream. Regardless, the infrastructure device may thereafter receive another request for at least one increased rate data stream and, in response, provide the at least one increased rate data stream to the device. In this manner, the present invention provides techniques for adjusting content delivery to devices and thereby providing power consumption control at such devices.

Figure 1:
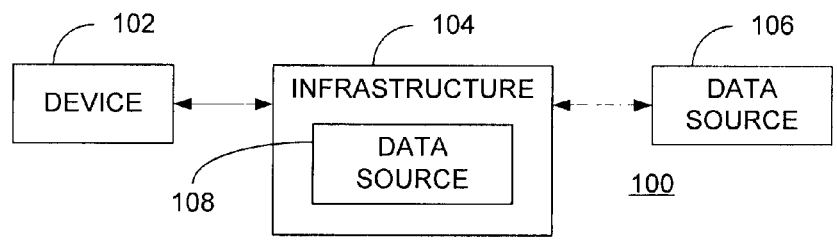
FIG. 1 is a schematic block diagram of a communication system in accordance with the present invention.

Referring now to FIG. 1, a communication system 100, comprising one or more devices 102 (only one shown) in communication with an infrastructure 104, is illustrated. The infrastructure 104 comprises one or more data sources 108 or communicates with one or more data sources 106. As used herein, a device 102 may comprise any device that operates from a limited (preferably portable and rechargeable) source of power, including but not limited to one or more batteries. Such devices 102 are typically, but not necessarily, portable and may comprise cellular phones, personal digital assistants, digital camcorders, audio recorders, laptop computers, etc. as known in the art. The devices 102 may comprise wireless devices that communicate with the infrastructure 104 via wireless channels, such as radio frequency (RF) channels. However, this is not a necessity, and the devices 102 may also comprise devices having wired connections with the infrastructure 104, e.g., a desktop computer coupled to a computer network. In further alternative embodiments, the devices 102 may have a relatively constant power source (e.g., a desktop computer connected to a conventional power outlet) but may implement features of the present invention to conserve power for environmental or electrical power grid reasons (e.g., in response to requests for power grid operators to reduce electrical consumption).

The infrastructure 104 comprises those devices or elements necessary to support communication with the device 102. For example, in a wired communication system, such as a computer network, the infrastructure 104 may comprise routers, gateways, servers, and other network elements well understood by those having skill in the art. An exemplary infrastructure based on a wireless communication system is further illustrated with reference to FIG. 4, discussed in further detail below. Regardless of the nature of the cooperating infrastructure 104, one or more data sources, 106, 108 provide data to the device 102. As shown, the data sources may comprise data sources 106 that reside outside of the infrastructure 104 or data sources 108 that reside within the infrastructure 104. For example, the external data sources 106 may comprise a web site maintained on a host server operated by a third party entity and accessible through a public communication network such as the World Wide Web. Alternatively, the internal data source 108 may comprise a proxy or cache server storing data currently being accessed by the device 102. As used herein, the terms data or content encompass virtually any form of information that may be provided to a device. Furthermore, such data or content, when provided to the devices 102, is embodied in a so-called data stream, indicative of the fact that the data is provided in a relatively continuous fashion to the devices 102. It should be noted that, while the present invention is likely to provide the most benefit in those instances of data streams having long durations (e.g., a video data file), it is equally applicable to data streams of relatively short duration, particularly multiple, short data streams that are successively received (e.g., numerous web page graphics). Examples of data streams include, but are not limited to, video data, audio data, graphics, etc. It should be noted that the communication system 100 is intended to illustrate very broad classification of communication systems and the present invention may be incorporated into a wide variety of such networks.

Figure 2:
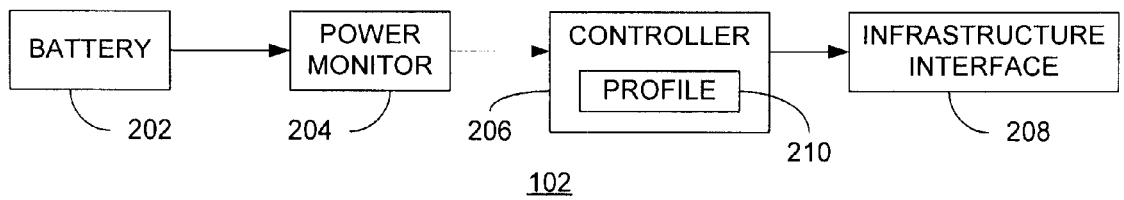
FIG. 2 is a schematic block diagram of a device in accordance with the present invention.

Referring now to FIG. 2, a device 102 in accordance with the present invention is illustrated in greater detail. In particular, the device 102 comprises a battery 202 in communication with a power monitor 204. In turn, the power monitor 204 is coupled to a device controller 206 that communicates with an infrastructure interface 208. As those having skill in the art will recognize, numerous other elements that may be incorporated into a device (e.g., various input/output devices, data ports, etc.) have not been shown for ease of illustration. As noted above, the battery 202 may comprise any limited power source such as one or more alkaline batteries, nickel cadmium (NiCd) batteries or lithium ion batteries. Alternatively, the battery 202 may actually comprise a non-battery source, such as large storage capacitors or other circuits useful for storing power. Further still, the battery 202 may be replaced with a relatively unlimited, constant power source such as a conventional power outlet in the case, for example, of a wholly or partially manually-initiated implementation (as opposed to automated implementation through use of the power monitor 204) of the present invention. As known in the art, the battery 202 (or other type of power source) typically provides electrical power to all components of the device 102.

The power monitor 204 may comprise any circuitry or combination of circuitry and firmware or software elements that may be used to monitor the operational status of the battery 202 (or other power source including a conventional power outlet). For example, the power monitor 204 may monitor the voltage level of the battery 202 and ascertain when the voltage level has fallen below a desired threshold. Alternatively, or in addition, the power monitor 204 can monitor the current output of the battery 202 relative to predetermined levels. Further still, the power monitor 204 may comprise a timing device that monitors the amount of time the battery 202 has provided power to the device 102. In this case, the power monitor 204 can determine when the battery 202 has reached a certain amount of usage and, therefore, approach the limits of its electrical power delivery capabilities. Designs for power monitors that operate as described above are well known to those having skill in the art. It is noted that the present invention is not limited to any specific implementation of either the battery 202 or power monitor 204, and instead is capable of operating with virtually any combination of such components.

The controller 206 controls the overall operation of the device 102. Controller 206 may be implemented using hardware and/or software elements. For example, in a presently preferred embodiment, the controller 206 comprises a processor such as a microcontroller, microprocessor, digital signal processor, or combinations thereof, operating under the control of executable instructions stored in one or more suitable storage devices such as random access memory (RAM) or read-only memory (ROM), as known in the art. In a presently preferred embodiment, the controller 206 continuously receives information regarding the operational status or condition of the battery 202 from the power monitor 204, which it compares with a configurable power condition profile 210 in order to determine whether an unfavorable power supply condition currently exists at the battery 202. It is anticipated that the power monitor 204 will operate in a true monitoring fashion, i.e., simply reporting the condition of the battery 202 without further analysis. However, it is possible that the "intelligence" used to understand the significance of the battery's operation status (i.e., the profile 210) could be employed in the power monitor 204 rather than the controller 206, or distributed between the two as a matter of design choice. Regardless, as described in greater detail below, the profile 210, which may be configured by a user of the device 102 or by elements within the infrastructure 104, sets forth conditions where it may be desirable to adjust content delivery to the device 102 in order to reduce power consumption.

The infrastructure interface 208 supports those operations necessary to provide communication between the device 102 and the infrastructure 104. For example, where the device 102 comprises a wireless device, the infrastructure interface 208 may comprise a wireless transceiver or a wireless modem as known to those having skill in the art. Conversely, where the device 102 comprises a wired device, the infrastructure interface 208 may comprise suitable hardware and software elements necessary to support a wired interface such as a Universal Serial Bus (USB) interface or an Ethernet interface. Once again, it is noted that the present invention is not limited by the particular implementation of the infrastructure interface 208, whether wired or wireless.

Figure 3:
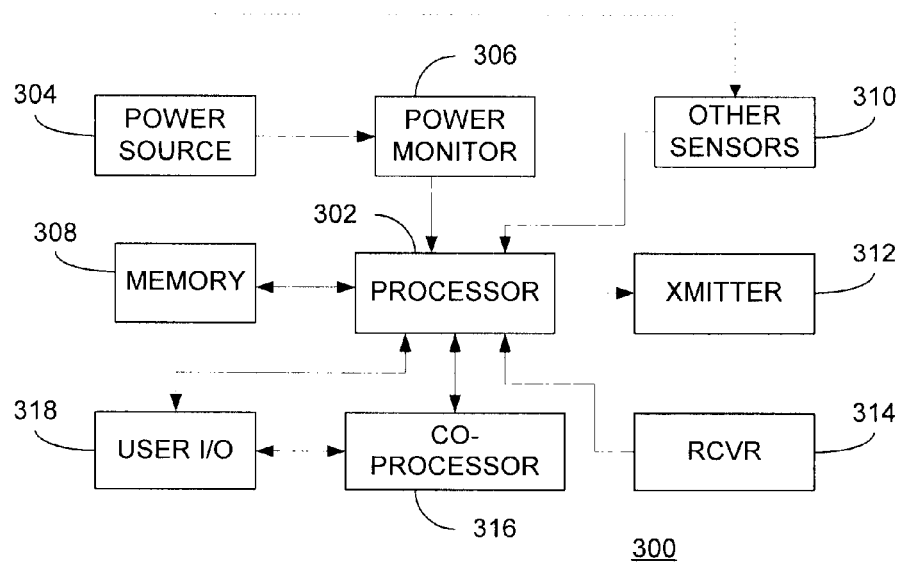
FIG. 3 is a schematic block diagram illustrating an exemplary embodiment of a device in accordance with the present invention.

Referring now to FIG. 3, an exemplary embodiment of a device 300, preferably a battery operated device, in accordance with the present invention is illustrated. In particular, the device 300 comprises an application processor 302 in communication with memory 308. The processor 302 may comprise a microcontroller, microprocessor, digital signal processor, or combinations thereof, as known in the art. Likewise, the memory 308 may comprise RAM or ROM or other suitable storage devices used to store executable instructions that control operation of the processor 302. As described above with reference to FIG. 2, a power source 304 is in communication with a power monitor 306, which in turn provides information regarding power supply condition information to the processor 302. The memory 308 may also store a configurable power condition profile used by the host to assess the information regarding power supply condition. Furthermore, other sensors 310 such as temperature sensors, vibration sensors, moisture sensors or other components known to those having skill in the art can also be provided. For example, a temperature sensor may be provided to monitor the temperature of the power source 304 as illustrated by the dashed line. In this manner, temperature of the power source 304 (or other parameters depending on the nature of the specific sensor(s) 310) can also be used as an input when determining the operational status of the power source 304.

As shown, a transmitter 312 and receiver 314 are providing and in communication with the processor 302. In a presently preferred embodiment, the transmitter 312 and receiver 314 operate in a wireless manner using circuitry and processing techniques well known to those having ordinary skill in the art. Note that both the transmitter 312 and receiver 314 may be operated at various data rates in accordance with data to be transmitted and/or received. Typically, lower transmitted and received data rates result in lower power consumption.

The device 300 may comprise one or more co-processors 316, such as graphics or video co-processors, in communication with the processor 302. Although not shown in FIG. 3, the co-processor(s) may share the memory 308 with the processor 302 and/or use local memory accessible only to the co-processor(s). As known in the art, such coprocessors are used to offload certain processing tasks from the processor 302 thereby allowing the processor 302 to handle other processing tasks. Depending on the nature of the data streams being received, the co-processor(s) 316 may be called into greater or lesser use thereby affecting the overall power consumption of the device 300. Thus, in order to reduce power consumption of the device 300, it may be beneficial to reduce the data rate of certain data streams that make extensive use of the co-processor(s) 316. Additionally, it may be the case that the co-processor(s) 316 are capable of processing certain data streams at a greater rate than that of processor 302 and it may therefore be preferable for purposes of power conservation to reduce power consumption of the device 300 by disabling or reducing operation of the co-processor(s) 316 and shifting data stream processing (albeit, at a reduced data rate) to the processor 302, if possible. Finally, the device 300 may comprise one or more user input/output devices 318 in communication with the processor 302. Such devices are known in the art and include, but are not limited to, keyboards, keypads, buttons, microphones, touch screens, display screens, speakers, annunciators, or any other device that allows the user of the device 300 to provide input to or receive output from the device 300. In one alternative embodiment, an input device 318 may be used to manually initiate the power-saving techniques taught by the present invention, rather than relying on monitors or sensors to detect power supply condition.

Figure 4:
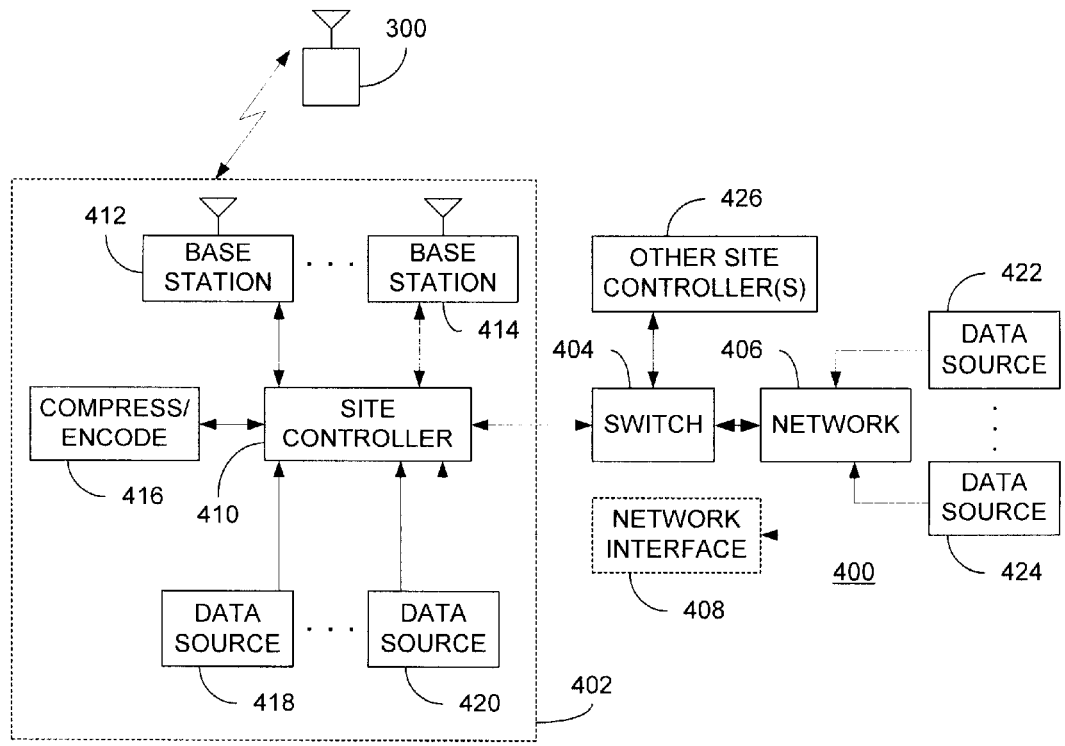
FIG. 4 is a schematic block diagram of an exemplary communication system in accordance with the present invention.

Referring now to FIG. 4, an exemplary communication infrastructure 400 in accordance with the present invention is further illustrated. In particular, the infrastructure 400 comprises a wireless communication site 402 coupled to a communication switch 404. The site 402 comprises a site controller 410 in communication with a plurality of base stations 412, 414. The combination of the site controller 410 and base stations 412, 414 (and other components not shown for ease of illustration) is well known in the art of wireless communication systems and is frequently used to support wireless communications with devices, as shown. The site controller 410 is also in communication with one or more compress/encode devices 416. As known in the art, each compress/encode device 416 may operate upon data of various media types and apply compression encoding to the data such that the resulting encoded data requires substantially less resources to be transmitted or received, particularly when being sent to a device. For example, each compress/encode device 416 preferably comprises a variable rate voice encoder or a variable rate video encoder as known in the art. For example, a compress/encode device 416 may implement any of a number of well-known video encoding standards, such as the so-called H.264, H.263 or MPEG-4 standards. It should be noted that, although the compress/encode devices 416 are illustrated in communication with the site controller 410, this is not a requirement and the compress/encode devices 416 may in fact communicate directly with other devices within the site 402 such as the base stations 412, 414 or other elements outside the site 402.

The site controller 410 is also illustrated as being in communication with one or more local data sources 418, 420, such as proxy or cache servers, as known in the art. In general, the site controller may be provided data from one of the data sources 418, 420, which data the site controller 410 thereafter provides to the compress/encode device 416. In turn, the compress/encode device 416 encodes the data and provides the encoded data to the site controller 410, or directly to one or more base stations 412, 414 (not shown), for transmission to a device. Preferably, either the site controller 410 or one or more of the base stations 412, 414 may be further encode the encoded data (e.g., add error correction coding) prior to transmission to the device.

As further illustrated, the site 402 can communicate with the switch 404 that in turn communicates with one or more networks 406 as well as other site controllers 426. Switches 404 as shown in FIG. 4 are well known in the field of telecommunications. Similarly, the network 406 may comprise a well-known public data network such as the Internet or World Wide Web, or may include or be entirely composed of elements of a proprietary private network, such as a corporate intranet. Regardless, the network 406 provides communications with one or more data sources 422, 424, as described above. Alternatively, the site 402 may comprise a network interface 408 which bypasses the communication switch 404 thereby providing the site 402 with direct access to the network 406. Regardless, the site 402 has access to a wide variety of data sources 418-424. Likewise, by virtue of the communications established by the switch 404 with other site controllers 426 (supporting communications with other devices), the site 402 (and, the devices with which it communicates) can communicate with other devices supported by the infrastructure 400.

Figure 5:
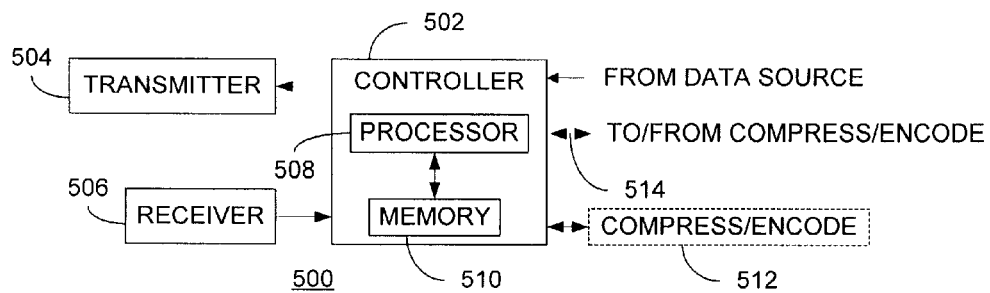
FIG. 5 is a schematic block diagram illustrating an exemplary embodiment of an infrastructure device in accordance with the present invention.

Referring now to FIG. 5, an exemplary embodiment of an infrastructure device 500 in accordance with the present invention is illustrated. In particular, the device 500 comprises a controller 502 coupled to a transmitter 504 and receiver 506. In a presently preferred embodiment, the controller 502 comprises a processor 508 in communication with memory 510, which processor 508 and memory 510 may be implemented as described above with reference to, e.g., FIG. 3. Note that the infrastructure device 500 may comprise any of a number of devices found in the communication infrastructure. For example, and with reference to FIG. 4, the infrastructure device 500 may be embodied in a site controller 410, 426, base station 412, 414, or even switch 404 as a matter of design choice. In those instances where the infrastructure generally comprises a computer network, the infrastructure device 500 may be embodied in a server, router, gateway, etc.

The specific implementation of the transmitter 504 and receiver 506 is dependent upon the type of the infrastructure device 500 within which they are deployed. For example, where the infrastructure device 500 comprises a base station, the transmitter 504 and receiver 506 may comprise wireless elements, e.g., RF transmitters/receivers, as known in the art. Alternatively, where the infrastructure device 500 comprises a site controller or switch (or, in the case of a computer network, a server or similar device), the transmitter 504 and receiver 506 may be embodied by a suitable network interface, such as an Ethernet interface. Regardless, the controller 502 receives data from a data source either directly or through other infrastructure elements not shown. Furthermore, the controller 502 may communicate directly with a compress/encode device 512 or it may maintain a communication link 514 with a compress/encode device via other infrastructure elements not shown.

Figure 6:
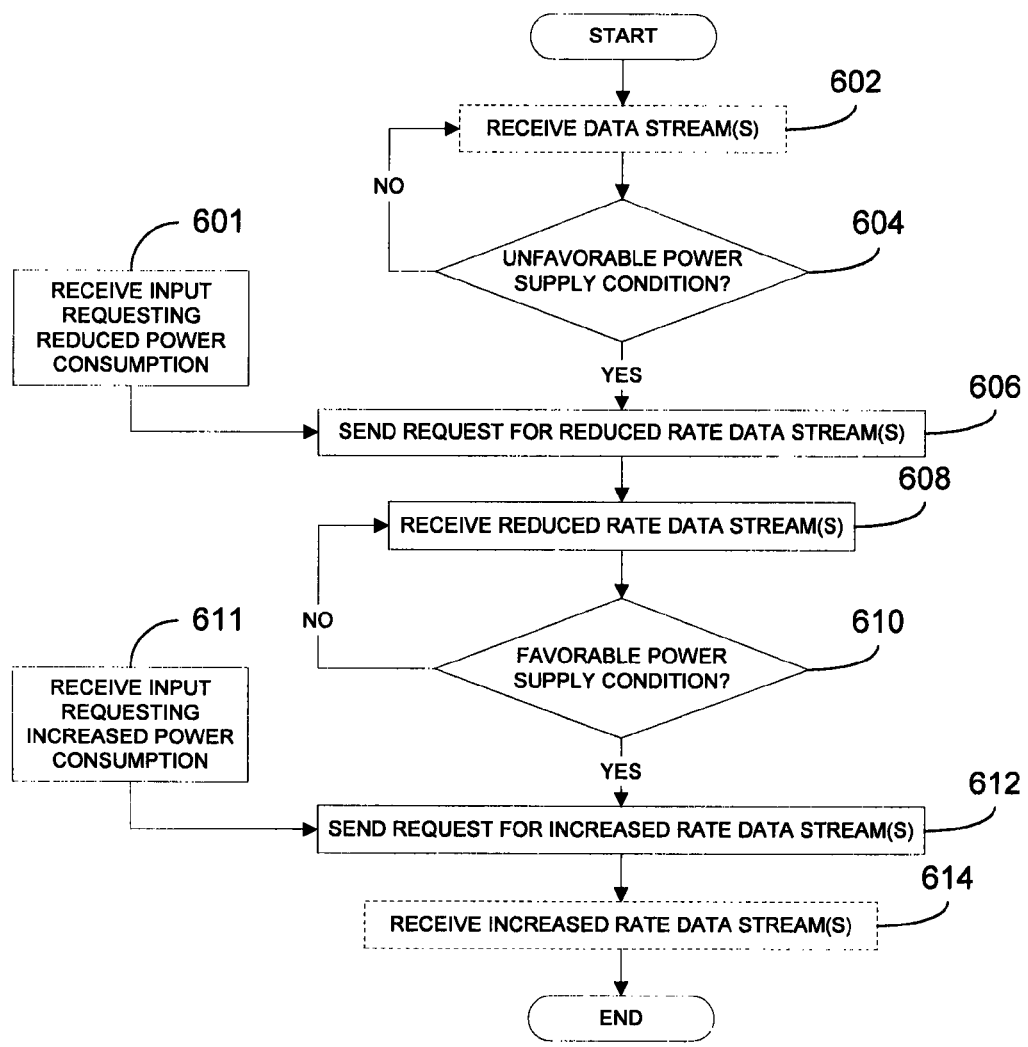
FIG. 6 is a flowchart illustrating processing performed by a device in accordance with the present invention.

Referring now to FIG. 6, processing by a device (preferably, battery operated) in accordance with the present invention is further illustrated. Preferably, the processing illustrated in FIG. 6 is carried out by a processor operating under the control of executable instructions stored in suitable memory. However, it is understood that other implementations using hardware elements such as programmable circuit arrays, application specific circuits or other similar devices can be equally employed. In one embodiment of the present invention, the device optionally receives, at block 602, at least one data stream from an infrastructure. In the context of the present invention, and as noted above, the at least one data stream may comprise any data that may be encoded at variable rates. For example, voice encoders are known in the art that may encode audio data at a rate of 9,600 bits per second (bps), 4,800 bps, or even 2,400 bps. Likewise, certain video encoding schemes encode video data at various (typically higher) data rates. Note that the at least one data stream may comprise data streams of different types, e.g., a video data stream, an audio data stream, and/or a graphics data stream, as in the case of multimedia content. Regardless whether the device is receiving the at least one data stream at block 602, processing continues at block 604 where it is determined whether an unfavorable power supply condition exists. Processing continues in this manner until such time as an unfavorable power supply condition is determined at block 604.

In an alternative embodiment, an input may be received by the device, as illustrated by block 601, instructing the device to reduce power consumption by the device. The input may be received via a user of the device manipulating an appropriate input mechanism or, alternatively, via a managing entity (for example, a controller, administrator console, network manager, etc. deployed within the communication infrastructure) that instructs the device to reduce power consumption without user intervention.

Returning to the embodiment based on detected power supply condition, in the context of the present invention, an unfavorable power supply condition is any set of circumstances where it would be desirable to reduce power consumption of the device. For example, this may arise when the voltage and/or current output of the battery (or other source) supplying power to the device fall(s) below predetermined threshold levels, or where temperature of the power source (or other components of the device) rises above a certain threshold. On the other hand, favorable power supply conditions may exist when the relevant parameters do not exceed (or fall under, as the case may be) corresponding thresholds. In a presently preferred embodiment, a configurable power condition profile may be employed for the purpose of determining the existence of favorable or unfavorable power supply conditions. Essentially, the power condition profile is a set of one or more rules used to evaluate the sensed parameters described above and, optionally, to set forth a course of action in response to the determined power supply condition. For example, in a relatively simple implementation, the profile may set forth a rule concerning the voltage of the device's power source. While the voltage exceeds a voltage threshold, all received video data streams, for example, may comprise full-rate encoded video, such as video data encoded according to the so-called H.264, H.263 or MPEG-4 standards. However, if the voltage falls below the voltage threshold, all received video data streams should not exceed a certain encoding rate, e.g., half-rate. Alternatively, this approach of reducing received data streams could be taken to a logical extreme such that, when the voltage falls below the voltage threshold, all video data streams may be discontinued altogether. Further still, where multiple data streams are involved, rate reduction could be applied across data streams. For example, both received video and audio data streams could be received at reduced rates.

Because reducing rates of received data streams often commensurately reduces the quality of reproduced information when such data streams are decoded, it may be desirable to cause the data streams to be reduced such that decoded quality is gradually degraded in a manner most acceptable to a user of the device. Thus, in a more complex embodiment, multiple thresholds (potentially concerning multiple parameters) may be established. Further still, specific sets of multiple thresholds may be tailored to specific applications being executed by the device. For example, a given user may prefer, when participating in a video teleconference, that video data streams are degraded or eliminated prior to or at a faster rate than audio data streams. Conversely, when using a graphics-intensive, on-line gaming application, the user may prefer that audio data streams are degraded or eliminated prior to or at a faster rate than graphics data streams. In this case, a first set of, for example, voltage thresholds, may be established for the video teleconferencing application such that, as the voltage falls below a first threshold, a video data stream is degraded (i.e., received at a reduced rate) first. As the voltage falls below a second threshold, the video data stream may be eliminated entirely. Thereafter, as the voltage falls below a third threshold, the audio data stream may be degraded until such time as the voltage falls to unacceptably low levels. It is understood that the examples described above for the configurable power condition profile are for illustrative purposes and are not intended to be exhaustive of the various combinations of parameters, rules or actions that may be devised by those having skill in the art.

As noted previously, and as described in the above examples, the power condition profile is preferably configurable to match the needs of a user of a device. To this end, the profile may be programmed at the device using, for example, known menu-driven data input techniques. Thus, in one embodiment, a user may be presented with a rule input interface on a display that allows him or her to enter rules as described above. Alternatively, profiles may be configured using components residing in the infrastructure and subsequently provided to one or more devices. This option may be particularly useful in the case where a single entity or organization deploys a relatively large number of devices, such as a large corporation or public utility, where it would be useful to centrally control device behavior. In this case, a rule input interface may be provided at an administrator console coupled to the communication infrastructure, and the one or more profiles configured in this manner distributed via the infrastructure to the relevant devices.

Although the configurable power condition profile is preferably deployed within the device, this is not a requirement. For example, although not preferred, the profile for a given device could reside entirely within the infrastructure. The device would periodically provide information concerning its power supply status to the infrastructure for evaluation. In yet another alternative, the profile could be distributed between the device and the infrastructure. For example, the parameter thresholds would be stored at the device and the actions to be performed when the threshold tests are met would be stored within an appropriate infrastructure device.

Referring once again to FIG. 6, when it is determined that an unfavorable power supply condition exists at block 604 or subsequent to receipt of the input at block 601, processing continues at block 606 where the device sends a request for at least one reduced rate data stream to the infrastructure. The request for the reduced rate data stream or streams could be a simple request that requires the infrastructure to determine the best way to provide at least one reduced rate data stream, as in the case of the "split" power condition profile described above. Conversely, the request may be more complex such that it instructs the infrastructure how to produce the at least one reduced data stream, as in the case of the power condition profile residing entirely within the device. Regardless, processing continues at block 608 where the device receives the at least one reduced rate data stream from the infrastructure. In a presently preferred embodiment, the at least one reduced rata data stream comprises data that has been encoded at a lower bit rate prior. Although less preferred, other techniques that would provide reduced rate data streams include: lowering a frame rate of the encoded data within the reduced rate data stream, modifying the level of error correction encoding applied to the encoded data, etc. Further still, as described above, reduced rate data may be provided by deciding not to include certain data streams altogether. It should be noted that, when receiving the at least one reduced rate data stream, it may be necessary or desirable to adjust the operation of the receiver of the device such that it is compatible with the reduced rate data stream. Techniques for doing this are well known to those of an ordinary skill in the art. However, for example, one technique employed in various processors is to provide for variable voltage scaling and/or variable clock frequencies so as to adjust the processing capability of the processor(s) in reflection of the processing load placed or likely to be placed on the processor(s).

When the device enters an unfavorable power supply condition, it is anticipated that this condition will persist until such time as the device no longer receives the least one reduced rate data stream. However, it is possible the device may subsequently encounter the favorable power supply condition as illustrated at block 610. For example, this may be the case, as in the instance of a cellular telephone, where, during operation, the device is subsequently coupled to a recharging source for the battery while still operating as usual. Regardless of the underlying reason, if a favorable power supply condition is determined at the device, processing continues at block 612 where the device send a request for an increased rate data stream. Thereafter, at block 614, the device may receive the at least one increased rate data stream. Alternatively, at block 611, the device may receive an input instructing the device to increase (e.g., resume normal) power consumption. In a manner similar to block 601, the input received at block 611 may be received via a user of the device manipulating an appropriate input mechanism or, alternatively, via a managing entity that instructs the device to reduce power consumption without user intervention.

Figure 7:
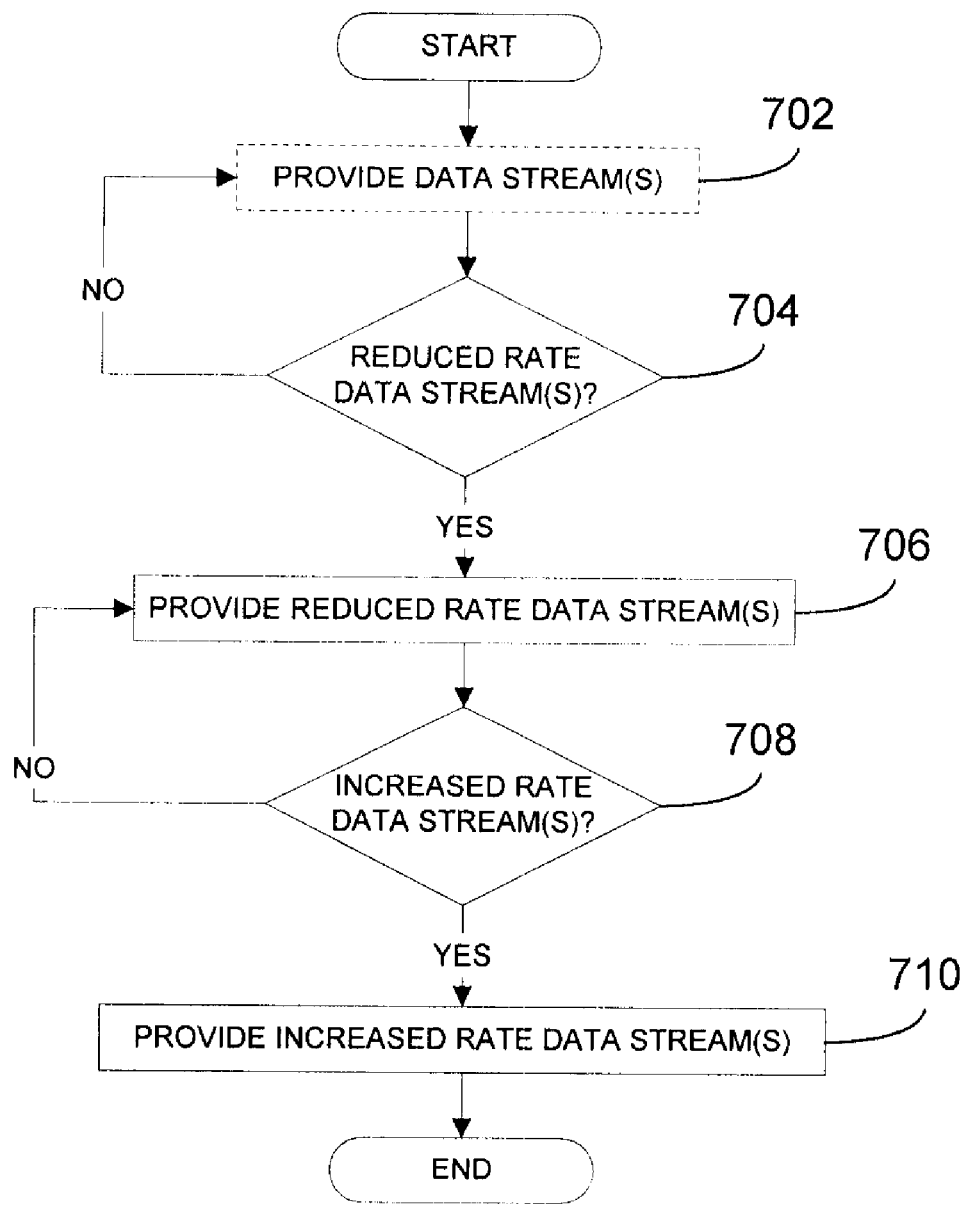
FIG. 7 is a flow chart illustrating processing performed by an infrastructure device in accordance with the present invention.

Referring now to FIG. 7, processing performed by an infrastructure device in accordance with the present invention is further illustrated. Preferably, the processing illustrated in FIG. 7 is carried out by a processor operating under the control of executable instructions stored in suitable memory. However, it is understood that other implementations using hardware elements such as programmable circuit arrays, application specific circuits or other similar devices can be equally employed. At block 702, the infrastructure device optionally provides at least one data stream to a device, preferably a battery powered device. Either prior to or during provision of the at least one data stream at block 702, it is determined whether a request for at least one reduced rate data stream has been received from the device at block 704. If so, processing continues at block 706 where the infrastructure device provides at least one reduced rate data stream in response to the request. As noted above, the request for the at least one reduced rate data stream may specify how the at least one reduced rate data stream is to be provided. Additionally, the infrastructure device may ascertain how to provide the at least one reduced rate data stream based on information available to it at that time. For example, the infrastructure device could take into account knowledge of the present infrastructure operating conditions (e.g., current loading, available communication channels, the existence of other devices requesting the same content, etc.) when determining how to provide the at least one reduced rate data stream. Regardless, the infrastructure device continues to provide the at least one reduced rate data stream to the device at block 706 until such time, at block 708, where it is determined that it has received a request for at least one increased rate data stream. Thereafter, at block 710, the infrastructure device provides the at least one increase rate data stream to the device.

As described above, the present invention provides a technique for controlling content delivery to a device, thereby providing power consumption control not previously available. By monitoring the power supply conditions at the device, requests for reduced rate data streams may be sent to an infrastructure, which reduced rate data streams, when processed at the device, require less power to decode. For at least these reasons, the present invention represents an advancement over prior art techniques.

It is therefore contemplated that the present invention cover any and all modifications, variations or equivalents that fall within the spirit and scope of the basic underlying principles disclosed above and claimed herein.

What is claimed is:

1. A method for adjusting content delivery to a user device that implements a video teleconferencing application, the method comprising:
   determining, in the user device, a need to modify power consumption of the user device by comparing battery power of the user device with a first threshold, a second threshold and a third threshold, wherein the first threshold defines a first level of power consumption below which a video stream of the video teleconferencing application should be degraded and an audio stream of the video teleconferencing application should not be changed, the second threshold defines a second level of power consumption below which the video stream of the video teleconferencing application should be eliminated and the audio stream of the video teleconferencing application should be degraded, and the third threshold defines a third level of power consumption below which the video stream of the video teleconferencing application should be eliminated and the audio stream of the video teleconferencing application should not be changed;
   sending, via the user device, a request to an infrastructure device to reduce or eliminate a data rate of at least one data stream to the user device, wherein a reduction in a data rate of the video stream of the video teleconferencing application is requested responsive to a determination that the battery power satisfies the first threshold, wherein elimination of the video stream of the video teleconferencing application and a reduction in a data rate of the audio stream of the video teleconferencing application is requested responsive to a determination that the battery power satisfies the second threshold, and wherein elimination of the video stream of the video teleconferencing application and no change to the audio stream of the video teleconferencing application is requested responsive to a determination that the battery power satisfies the third threshold; and
   receiving, at the user device, the video and audio streams of the video teleconferencing application from the infrastructure device, wherein following the request, the data rate of at least one of the video and audio streams of the video teleconferencing application are reduced or eliminated based on the request.

2. The method of claim 1, the method further comprising:
   sending the request via a wireless communication path.

3. The method of claim 1, further comprising:
   determining, in the user device, another need to modify power consumption of the user device;
   sending, via user device, another request to the infrastructure device; and
   receiving, at the user device, at least one increased rate data stream from the infrastructure device for at least one of the first and second data streams in response to the another request.

4. The method of claim 3, wherein determining another need to modify power consumption of the user device includes identifying a favorable power supply condition of the user device.

5. The method of claim 1, further comprising determining whether a temperature in the user device exceeds a temperature threshold and sending another request to the infrastructure device to reduce or eliminate the data rate of at least one data stream to the user device when the temperature in the user device exceeds the temperature threshold.

6. A method for adjusting content delivery from an infrastructure device to a user device that implements a video teleconferencing application, the method comprising:
   receiving, at the infrastructure device, a request from a user device to reduce a data rate of at least one data stream to the user device, wherein the user device determines a need to modify power consumption of the user device by comparing battery power of the user device with a first threshold, a second threshold and a third threshold, wherein the first threshold defines a first level of power consumption below which a video stream of the video teleconferencing application should be degraded and an audio stream of the video teleconferencing application should not be changed, the second threshold defines a second level of power consumption below which the video stream of the video teleconferencing application should be eliminated and the audio stream of the video teleconferencing application should be degraded, and the third threshold defines a third level of power consumption below which the video stream of the video teleconferencing application should be eliminated and the audio stream of the video teleconferencing application should not be changed;
   sending, from the infrastructure device, the video and audio streams of the video teleconferencing application, wherein following the request, the data rate of at least one of the video and audio streams of the video teleconferencing application are reduced or eliminated based on the request from the user device, and wherein a reduction in a data rate of the video stream of the video teleconferencing application occurs when the user device determines that the battery power satisfies the first threshold, wherein elimination of the video stream of the video teleconferencing application and a reduction in a data rate of the audio stream of the video teleconferencing application occurs when the user device determines that the battery power satisfies the second threshold, and wherein elimination of the video stream of the video teleconferencing application and no change to the audio stream of the video teleconferencing application occurs when the user device determines that the battery power satisfies the third threshold.

7. The method of claim 6, the method further comprising:
   receiving the request via a wireless communication path.

8. The method of claim 6, further comprising:
   receiving, from user device, another request; and sending, to user device, at least one increased rate data stream from the infrastructure device for at least one of the first and second data streams in response to the another request.

9. The method of claim 8, wherein the another request is sent from the user device based on the user device determining a favorable power supply condition of the user device.

10. The method of claim 6, further comprising determining at the user device whether a temperature in the user device exceeds a temperature threshold and sending another request from the user device to the infrastructure device to reduce or eliminate the data rate of at least one data stream when the temperature in the user device exceeds the temperature threshold.

11. A user device that implements a video teleconferencing application and receives content from an infrastructure device, the user device comprising:
a controller configured to determine a need to modify power consumption of the user device by comparing battery power of the user device with a first threshold, a second threshold and a third threshold, wherein the first threshold defines a first level of power consumption below which a video stream of the video teleconferencing application should be degraded and an audio stream of the video teleconferencing application should not be changed, the second threshold defines a second level of power consumption below which the video stream of the video teleconferencing application should be eliminated and the audio stream of the video teleconferencing application should be degraded, and the third threshold defines a third level of power consumption below which the video stream of the video teleconferencing application should be eliminated and the audio stream of the video teleconferencing application should not be changed;
an infrastructure interface, coupled to the controller, configured to send a request to the infrastructure device to reduce or eliminate a data rate of at least one data stream to the user device, wherein a reduction in a data rate of the video stream of the video teleconferencing application is requested responsive to a determination that the battery power satisfies the first threshold, wherein elimination of the video stream of the video teleconferencing application and a reduction in a data rate of the audio stream of the video teleconferencing application is requested responsive to a determination that the battery power satisfies the second threshold, and wherein elimination of the video stream of the video teleconferencing application and no change to the audio stream of the video teleconferencing application is requested responsive to a determination that the battery power satisfies the third threshold,
wherein the infrastructure interface is configured to receive the video and audio streams of the video teleconferencing application from the infrastructure device, wherein following the request, the data rate of at least one of the video and audio streams of the video teleconferencing application are reduced or eliminated based on the request.

12. The user device of claim 11, wherein the infrastructure interface sends the request via a wireless communication path.

13. The user device of claim 11, further wherein:
the controller determines another need to modify power consumption of the user device;
the infrastructure interface sends another request to the infrastructure device; and
the infrastructure interface receives at least one increased rate data stream from the infrastructure device for at least one of the first and second data streams in response to the another request.

14. The user device of claim 13, wherein in determining another need to modify power consumption of the user device, the controller identifies a favorable power supply condition of the user device.

15. The user device of claim 11, wherein the controller further determines whether a temperature in the user device exceeds a temperature threshold and sends another request to the infrastructure device to reduce or eliminate the data rate of at least one data stream to the user device when the temperature in the user device exceeds the temperature threshold.

16. A user device that receives content from an infrastructure device and implements a video teleconferencing application, the user device comprising:
means for determining a need to modify power consumption of the user device by comparing battery power of the user device with a first threshold, a second threshold and a third threshold, wherein the first threshold defines a first level of power consumption below which a video stream of the video teleconferencing application should be degraded and an audio stream of the video teleconferencing application should not be changed, and the second threshold defines a second level of power consumption below which the video stream of the video teleconferencing application should be eliminated and the audio stream of the video teleconferencing application should be degraded, and the third threshold defines a third level of power consumption below which the video stream of the video teleconferencing application should be eliminated and the audio stream of the video teleconferencing application should not be changed;
means for sending a request to an infrastructure device to reduce or eliminate a data rate of at least one data stream to the user device, wherein a reduction in a data rate of the video stream of the video teleconferencing application is requested responsive to a determination that the battery power satisfies the first threshold, wherein elimination of the video stream of the video teleconferencing application and a reduction in a data rate of the audio stream of the video teleconferencing application is requested responsive to a determination that the battery power satisfies the second threshold, and wherein elimination of the video stream of the video teleconferencing application and no change to the audio stream of the video teleconferencing application is requested responsive to a determination that the battery power satisfies the third threshold; and
means for receiving the video and audio streams of the video teleconferencing application from the infrastructure device, wherein following the request, the data rate of at least one of the video and audio streams of the video teleconferencing application are reduced or eliminated based on the request.

17. The user device of claim 16, wherein the user device further comprises means for determining whether a temperature in the user device exceeds a temperature threshold and means for sending another request to the infrastructure device to reduce or eliminate the data rate of at least one data stream to the user device when the temperature in the user device exceeds the temperature threshold.

18. An infrastructure device that adjusts content delivery to a user device that implements a video teleconferencing application, the infrastructure device comprising:

means for receiving a request from a user device to reduce a data rate of at least one data stream to the user device, wherein the user device determines a need to modify power consumption of the user device by comparing battery power of the user device with a first threshold, a second threshold and a third threshold, wherein the first threshold defines a first level of power consumption below which a video stream of the video teleconferencing application should be degraded and an audio stream of the video teleconferencing application should not be changed, the second threshold defines a second level of power consumption below which the video stream of the video teleconferencing application should be eliminated and the audio stream of the video teleconferencing application should be degraded, and the third threshold defines a third level of power consumption below which the video stream of the video teleconferencing application should be eliminated and the audio stream of the video teleconferencing application should not be changed;

means for sending the video and audio streams of the video teleconferencing application, wherein following the request, the data rate of at least one of the video and audio streams of the video teleconferencing application are reduced or eliminated based on the request from the user device, and wherein a reduction in a data rate of the video stream of the video teleconferencing application occurs when the user device determines that the battery power satisfies the first threshold, wherein elimination of the video stream of the video teleconferencing application and a reduction in a data rate of the audio stream of the video teleconferencing application occurs when the user device determines that the battery power satisfies the second threshold, and wherein elimination of the video stream of the video teleconferencing application and no change to the audio stream of the video teleconferencing application occurs when the user device determines that the battery power satisfies the third threshold.

19. The infrastructure device of claim 18, wherein the user device further determines whether a temperature in the user device exceeds a temperature threshold and the infrastructure device includes means for receiving another request from the user device to reduce or eliminate the data rate of at least one data stream when the temperature in the user device exceeds the temperature threshold.

20. A system comprising a user device and an infrastructure device, wherein the user device receives content from the infrastructure device,
wherein the user device is configured to determine a need to modify power consumption of the user device by comparing battery power of the user device with a first threshold, a second threshold and a third threshold, wherein the first threshold defines a first level of power consumption below which a video stream of the video teleconferencing application should be degraded and an audio stream of the video teleconferencing application should not be changed, the second threshold defines a second level of power consumption below which the video stream of the video teleconferencing application should be eliminated and the audio stream of the video teleconferencing application should be degraded, and the third threshold defines a third level of power consumption below which the video stream of the video teleconferencing application should be eliminated and the audio stream of the video teleconferencing application should not be changed;

wherein the user device is configured to send a request to the infrastructure device to reduce or eliminate a data rate of at least one data stream to the user device, wherein a reduction in a data rate of the video stream of the video teleconferencing application is requested responsive to a determination that the battery power satisfies the first threshold, wherein elimination of the video stream of the video teleconferencing application and a reduction in a data rate of the audio stream of the video teleconferencing application is requested responsive to a determination that the battery power satisfies the second threshold, and wherein elimination of the video stream of the video teleconferencing application and no change to the audio stream of the video teleconferencing application is requested responsive to a determination that the battery power satisfies the third threshold, wherein the infrastructure device is configured to send the video and audio streams of the video teleconferencing application, wherein following the request, the data rate of at least one of the video and audio streams of the video teleconferencing application are reduced or eliminated based on the request.

21. The system of claim 20, wherein the user device sends the request to the infrastructure device via a wireless communication path.

22. The system of claim 20, wherein:
the user device determines another need to modify power consumption of the user device;
the user device sends another request to the infrastructure device; and
the infrastructure device sends at least one increased rate data stream to the user device for at least one of the first and second data streams in response to the another request.

23. The system of claim 22, wherein in determining another need to modify power consumption of the user device, the user device identifies a favorable power supply condition of the user device.

24. The user device of claim 20, wherein the user device further determines whether a temperature in the user device exceeds a temperature threshold and sends another request to the infrastructure device to reduce or eliminate the data rate of at least one data stream to the user device when the temperature in the user device exceeds the temperature threshold.

* * * * *